(12) United States Patent
Hu et al.

(10) Patent No.: US 9,645,784 B2
(45) Date of Patent: May 9, 2017

(54) SCREEN SPLICING SYSTEM AND VIDEO DATA STREAM PROCESSING METHOD

(71) Applicant: HANGZHOU HIKVISION DIGITAL TECHNOLOGY CO., LTD., Hangzhou, Zhejiang (CN)

(72) Inventors: Chunbo Hu, Zhejiang (CN); Zhenxiao Le, Zhejiang (CN); Linjie Shen, Zhejiang (CN); Chongji Huang, Hangzhou (CN)

(73) Assignee: HANGZHOU HIKVISION DIGITAL TECHNOLOGY CO., LTD., Hangzhou (CN)

( * ) Notice: Subject to any disclaimer, the term of this patent is extended or adjusted under 35 U.S.C. 154(b) by 0 days.

(21) Appl. No.: 15/037,280

(22) PCT Filed: Oct. 23, 2014

(86) PCT No.: PCT/CN2014/089348
§ 371 (c)(1),
(2) Date: May 17, 2016

(87) PCT Pub. No.: WO2015/070694
PCT Pub. Date: May 21, 2015

(65) Prior Publication Data
US 2016/0291917 A1   Oct. 6, 2016

(30) Foreign Application Priority Data
Nov. 18, 2013   (CN) .......................... 2013 1 0578376

(51) Int. Cl.
*H04N 5/21* (2006.01)
*G06F 3/14* (2006.01)
(Continued)

(52) U.S. Cl.
CPC .......... *G06F 3/1446* (2013.01); *H04N 5/268* (2013.01); *H04N 5/2624* (2013.01);
(Continued)

(58) Field of Classification Search
CPC .......... H04N 5/145; H04N 5/21; H04N 5/268; H04N 9/646; G06F 3/1446
(Continued)

(56) References Cited

U.S. PATENT DOCUMENTS

2009/0013356 A1* 1/2009 Doerr .................. H04L 65/4076
                                                              725/62
2011/0149019 A1   6/2011 Kellerman et al.

FOREIGN PATENT DOCUMENTS

CN    101778283 A    7/2010
CN    101807389 A    8/2010
(Continued)

OTHER PUBLICATIONS

Search Report for PCT International Application No. PCT/CN2014/089348, mailed Jan. 26, 2015.

*Primary Examiner* — Sherrie Hsia
(74) *Attorney, Agent, or Firm* — Pearl Cohen Zedek Latzer Baratz LLP (57) ABSTRACT

The invention discloses a screen splicing system and a video data stream processing method. The system includes: a video acquisition subsystem, configured to acquire an original video data stream, and output the acquired original video data stream to a smooth displaying subsystem after a smooth displaying image processing mode is enabled; the smooth displaying subsystem, connected with the video acquisition subsystem and configured to receive the original video data stream from the video acquisition subsystem, sequentially perform smooth displaying image processing and screen cutting processing on the original video data stream and
(Continued)

send the cut video data stream to a screen splicing subsystem; and the screen splicing subsystem, connected with the smooth displaying subsystem and configured to perform splicing processing on the cut video data stream and send the spliced video data stream to a splicing display wall. According to the technical solutions provided by the invention, screen splicing display smoothness is improved, and an overall display effect of the screen splicing system is remarkably improved.

16 Claims, 4 Drawing Sheets (51) Int. Cl.
| | | |
|---|---|---|
| H04N 5/268 | (2006.01) | |
| H04N 5/262 | (2006.01) | |
| H04N 5/445 | (2011.01) | |
| H04N 7/01 | (2006.01) | |
| H04N 21/431 | (2011.01) | |
| H04N 21/44 | (2011.01) | |
| H04N 5/14 | (2006.01) | |

(52) U.S. Cl.
CPC ....... *H04N 5/44591* (2013.01); *H04N 7/0127* (2013.01); *H04N 21/4316* (2013.01); *H04N 21/44* (2013.01); *H04N 5/145* (2013.01); *H04N 5/21* (2013.01)

(58) Field of Classification Search
USPC ......... 348/607, 618–621, 624, 701; 345/611, 345/1.1–1.3
IPC ..................................... H04N 5/21, 5/14, 5/268
See application file for complete search history.

(56) References Cited

FOREIGN PATENT DOCUMENTS

| | | |
|---|---|---|
| CN | 102104788 A | 6/2011 |
| CN | 102611869 A | 7/2012 |

* cited by examiner

SCREEN SPLICING SYSTEM AND VIDEO DATA STREAM PROCESSING METHOD

CROSS-REFERENCE TO RELATED APPLICATIONS

This application is a National Phase Application of PCT International Application No. PCT/CN2014/089348, International Filing Date Oct. 23, 2014, claiming priority of Chinese Patent Application No. 201310578376.6, filed Nov. 18, 2013, which is hereby incorporated by reference.

TECHNICAL FIELD OF THE INVENTION

The invention relates to the field of video display, and in particular to a screen splicing system and a video data stream processing method.

BACKGROUND OF THE INVENTION

Figure 1:
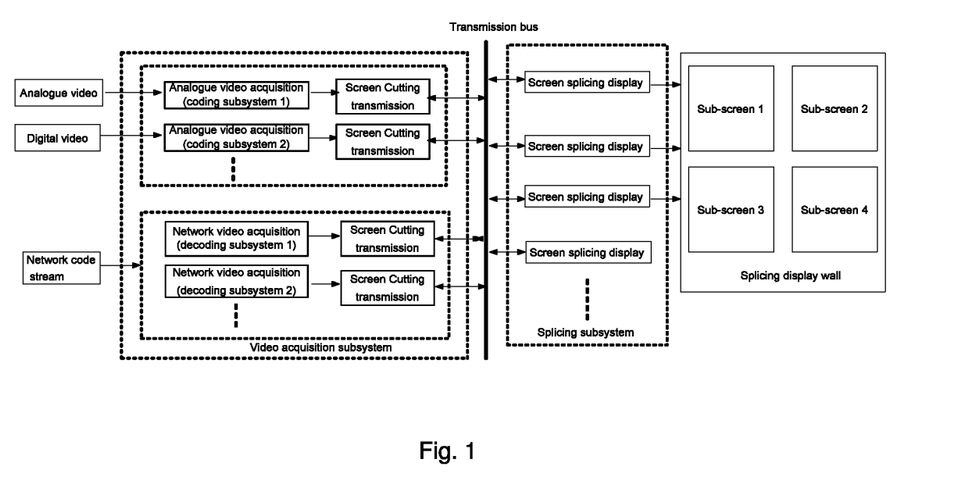
FIG. 1 is a schematic diagram of an implementation principle of a screen splicing system according to the related technology.

At present, a typical screen splicing system (adopting a multi-display screen splicing display manner to realize a single-screen display function) adopted in a related technology may support screen splicing and wandering display of analogue video signals, digital video signals, network compression code streams and the like. FIG. 1 is a schematic diagram of an implementation principle of a screen splicing system according to the related technology. As shown in FIG. 1, the screen splicing system may include: a video acquisition subsystem (which may specifically be divided into a coding subsystem and a decoding subsystem) and a screen splicing subsystem. The subsystems may perform video data interaction with one another through a Peripheral Component Interconnect Express (PCIe) and perform command parameter interaction through a master control subsystem.

Functions of each subsystem in the screen splicing system are introduced below respectively.

(1) The video acquisition subsystem is mainly configured to realize functions of video acquisition, screen cutting, video transmission and the like, wherein its typical video source may include: an analogue video signal, a digital video signal of an optical fibre/Serial Digital Interface (SDI)/Digital Video Interface (DVI)/High-Definition Multimedia Interface (HDMI) and a network compression code stream.

(2) The screen splicing subsystem is mainly configured to receive video data sent by the video acquisition subsystem, perform corresponding video processing on a received video image according to a screen splicing related control parameter, and output the processed video image to a splicing display wall for display through a video output interface.

Thus it can be seen that the screen splicing system emphasizes a video image display effect, and mainly focuses on video definition, video smoothness and synchronism between sub-screens. However, video smoothness of the screen splicing system adopted in the related technology entirely depends on a frame rate of a video source, while video frame rates of a current mainstream analogue camera, Internet Protocol Camera (IPC), Digital Video Recorder (DVR, which is a set of computer system for image storage processing and has functions of long-term image/voice recording, remote monitoring and control) and the like are all lower than a display refreshing frame rate (a frame rate of a typical IPC (which is a camera capable of generating a digital video stream and transmitting the video stream through a wired or wireless network) is 25 HZ/30 HZ, and a typical display refreshing frame rate is 50 HZ/60 HZ), so that splicing display of a mainstream video source on the screen splicing system which is used at present may not be so smooth, phenomena of image dithering and blurring may even occur, and viewing experiences of a user may not be so good.

SUMMARY OF THE INVENTION

The invention provides a screen splicing system and a video data stream processing method, so as to at least solve the problems that splicing display smoothness of a screen splicing system adopted in the related technology is poorer, that phenomena of image dithering and blurring may even occur and that viewing experiences of a user may not be so good.

According to one aspect of the invention, a screen splicing system is provided.

The screen splicing system according to the invention may include: a video acquisition subsystem, configured to acquire an original video data stream, and output the acquired original video data stream to a smooth displaying subsystem after a smooth displaying image processing mode is enabled; the smooth displaying subsystem, connected with the video acquisition subsystem and configured to receive the original video data stream from the video acquisition subsystem, sequentially perform smooth displaying image processing and screen cutting processing on the original video data stream and send the cut video data stream to a screen splicing subsystem; and the screen splicing subsystem, connected with the smooth displaying subsystem and configured to perform splicing processing on the cut video data stream and send the spliced video data stream to a splicing display wall.

Preferably, the smooth displaying subsystem may include: a video smooth displaying processing module, configured to sequentially perform smooth displaying image processing on every two adjacent original video image frames in the original video data stream to generate one or more smooth displaying video image frames, and interpolate each smooth displaying video image frame into the corresponding two adjacent original video image frames which generate the smooth displaying video image frame; and a video smooth displaying cutting transmission module, configured to perform screen cutting processing on the video data stream into which the one or more smooth displaying video image frames are interpolated, and output the video data stream to the screen splicing subsystem.

Preferably, the video smooth displaying processing module may be configured to sequentially acquire two adjacent original video image frames which are temporally continuous from the original video data stream, and execute smooth displaying calculation on every two adjacent original video image frames which are acquired to obtain the smooth displaying video image frames to be interpolated into every corresponding two adjacent original video image frames respectively.

Preferably, the video smooth displaying processing module may be configured to perform down-sampling image processing on a first original video image frame and second original video image frame which are adjacent to obtain a first down-sampled video image frame and a second down-sampled video image frame respectively, perform motion estimation on the first down-sampled video image frame and the second down-sampled video image frame to estimate a global motion vector respectively, and perform motion estimation on the first original video image frame and the second original video image frame to obtain the smooth displaying video image frame to be interpolated by adopting the global motion vector.

Preferably, the video smooth displaying cutting transmission module may be configured to perform screen cutting processing on the video data stream into which the one or more smooth displaying video image frames are interpolated according to the number of spliced sub-screens in a screen-splicing display screen, and send the cut video data stream to the screen splicing subsystem.

Preferably, the screen splicing system may further include: a master control subsystem, and the master control subsystem may be configured to acquire a display layer parameter set from the screen splicing subsystem under the condition that it is determined that the smooth displaying image processing mode has been enabled, send the display layer parameter set to the smooth displaying subsystem, acquire a smooth displaying image processing parameter set from the smooth displaying subsystem, and send the smooth displaying image processing parameter set to the video acquisition subsystem.

Preferably, the video acquisition subsystem may be configured to judge whether the smooth displaying image processing mode has been enabled or not at present, output the original video data stream to the smooth displaying subsystem under the condition that it is determined that the smooth displaying image processing mode has been enabled, and under the condition that it is determined that the smooth displaying image processing mode has not been enabled, perform screen cutting on the original video data stream and output the original video data stream to the screen splicing subsystem.

Preferably, the video acquisition subsystem may further be configured to acquire the original video data stream through a Video Port (VP), and/or, acquire a video compression code stream through a network and decode the video compression code stream to acquire the original video data stream.

According to another aspect of the invention, a video data stream processing method is provided.

The method is applied to the screen splicing subsystem, including: receiving an original video data stream from the video acquisition subsystem, and sequentially performing smooth displaying image processing on every two adjacent original video image frames in the original video data stream to generate one or more smooth displaying video image frames; and interpolating each smooth displaying video image frame into the corresponding two adjacent original video image frames which generate the smooth displaying video image frame, performing screen cutting processing on the video data stream into which the one or more smooth displaying video image frames are interpolated, and outputting the video data stream to the screen splicing subsystem.

Preferably, sequentially performing smooth displaying image processing on every two adjacent original video image frames in the original video data stream to generate the one or more smooth displaying video image frames may include: performing down-sampling image processing on a first original video image frame and second original video image frame which are adjacent to obtain a first down-sampled video image frame and a second down-sampled video image frame respectively; performing motion estimation on the first down-sampled video image frame and the second down-sampled video image frame to estimate a global motion vector respectively; and performing motion estimation on the first original video image frame and the second original video image frame to obtain the smooth displaying video image frame to be interpolated by adopting the global motion vector.

According to the embodiment of the invention, the original video data stream is received from the video acquisition subsystem, and smooth displaying image processing is sequentially performed on every two adjacent original video image frames in the original video data stream to generate the one or more smooth displaying video image frames; each smooth displaying video image frame is interpolated into the corresponding two adjacent original video image frames which generate the smooth displaying video image frame, screen cutting processing is performed on the video data stream into which the one or more smooth displaying video image frames are interpolated, and the video data stream is output to the screen splicing subsystem; that is, on the basis of a screen splicing system adopted in the related technology, the original video data stream acquired by the video acquisition subsystem is not directly output to the screen splicing subsystem, and instead, the original video data stream is output to the screen splicing subsystem after smooth displaying image processing; and therefore, the problems that splicing display smoothness of the screen splicing system adopted in the related technology is poorer, that phenomena of image dithering and blurring may even occur and that viewing experiences of a user may not be so good are solved, screen splicing display smoothness is further improved, and an overall display effect of the screen splicing system is remarkably improved.

BRIEF DESCRIPTION OF THE DRAWINGS

The drawings described here are adopted to provide further understanding of the invention, and form a part of the invention. Schematic embodiments of the invention and description thereof are adopted to explain the invention and not intended to form improper limits to the invention. In the drawings.

DETAILED DESCRIPTION OF THE INVENTION

The invention will be described below with reference to the drawings and embodiments in detail. It is important to note that the embodiments in the invention and characteristics in the embodiments can be combined under the condition of no conflicts.

In the description given below, each embodiment of the invention will be described with reference to symbols of action and operation executed by one or more computers, unless otherwise specified. Wherein, the computers include various products such as Personal Computers (PCs), servers and mobile terminals, and all products employing equipment such as Central Processing Units (CPUs), single-chip microcomputers and Digital Signal Processors (DSPs) with processing chips are called computers. Therefore, it can be understood that action and operation executed by a product which is called a computer includes control of a processing unit of the computer over an electrical signal which represents data in a structured form sometimes. Such control converts the data or maintains the data at a position in a memory system of the computer to reconfigure or change the operation of the computer in a manner which is understood by those skilled in the art. A data structure for maintaining the data is a physical position, which has a specific attribute defined by a format of the data, of a memory. However, the invention described in the context is not intended to be limited, and each aspect of the action and operation described hereinafter may also be implemented by hardware, as far as those skilled in the art understand.

In the drawings, the same reference numbers represent the same elements, and a principle of the invention is shown to be implemented in a proper calculation environment. It is not considered that the description given below is about a substitutive embodiment which is not clearly described here and thus intended to limit the invention, and the description is just given on the basis of the embodiment of the invention.

The following embodiment may be applied to a computer, for example: a PC, and may also be applied to an existing mobile terminal adopting an intelligent operating system, and there are no limits. The computer or the operating system of the mobile terminal is only required to detect a contact, judge whether the contact is consistent with a preset rule or not and realize a corresponding function according to an attribute of the contact, and there are no special requirements.

Figure 2:
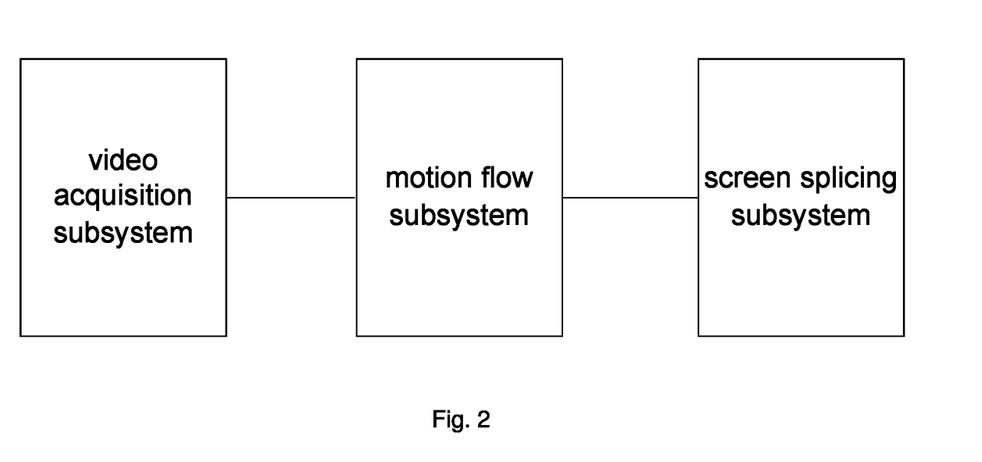
FIG. 2 is a structure diagram of a screen splicing system according to an embodiment of the invention.

FIG. 2 is a structure diagram of a screen splicing system according to an embodiment of the invention. As shown in FIG. 2, the screen splicing system may include: a video acquisition subsystem 10, configured to acquire an original video data stream, and output the acquired original video data stream to a smooth displaying subsystem after a smooth displaying image processing mode is enabled; the smooth displaying subsystem 20, connected with the video acquisition subsystem and configured to receive the original video data stream from the video acquisition subsystem, sequentially perform smooth displaying image processing and screen cutting processing on the original video data stream and send the cut video data stream to a screen splicing subsystem; and the screen splicing subsystem 30, connected with the smooth displaying subsystem and configured to perform splicing processing on the cut video data stream and send the spliced video data stream to a splicing display wall.

Splicing display smoothness of a screen splicing system adopted in the related technology may be poorer, phenomena of image dithering and blurring may even occur, and viewing experiences of a user may not be so good. According to the system shown in FIG. 2, the video acquisition subsystem acquires the original video data stream, and outputs the original video data stream to the smooth displaying subsystem after the smooth displaying image processing mode is enabled; the smooth displaying subsystem receives the original video data stream from the video acquisition subsystem, sequentially performs smooth displaying image processing and screen cutting processing on the original video data stream, and sends the cut video data stream to the screen splicing subsystem; the screen splicing subsystem performs splicing processing on the cut video data stream, and sends the video data stream to the splicing display wall; that is, on the basis of the screen splicing system adopted in the related technology, the original video data stream acquired by the video acquisition subsystem is not directly output to the screen splicing subsystem, and instead, the original video data stream is output to the screen splicing subsystem after smooth displaying image processing; and therefore, the problems that the splicing display smoothness of the screen splicing system adopted in the related technology is poorer, that the phenomena of image dithering and blurring may even occur and that the viewing experiences of the user may not be so good are solved, screen splicing display smoothness is further improved, and an overall display effect of the screen splicing system is remarkably improved.

It is important to note that smooth displaying may also be called a frame rate, and is a frame rate conversion technology, that is, a new frame is interpolated in a motion compensation manner on the basis of an original frame. By such a technology, a subjective visual effect of viewing a fast motion scene in a video with eyes may be improved to a great extent.

Figure 3:
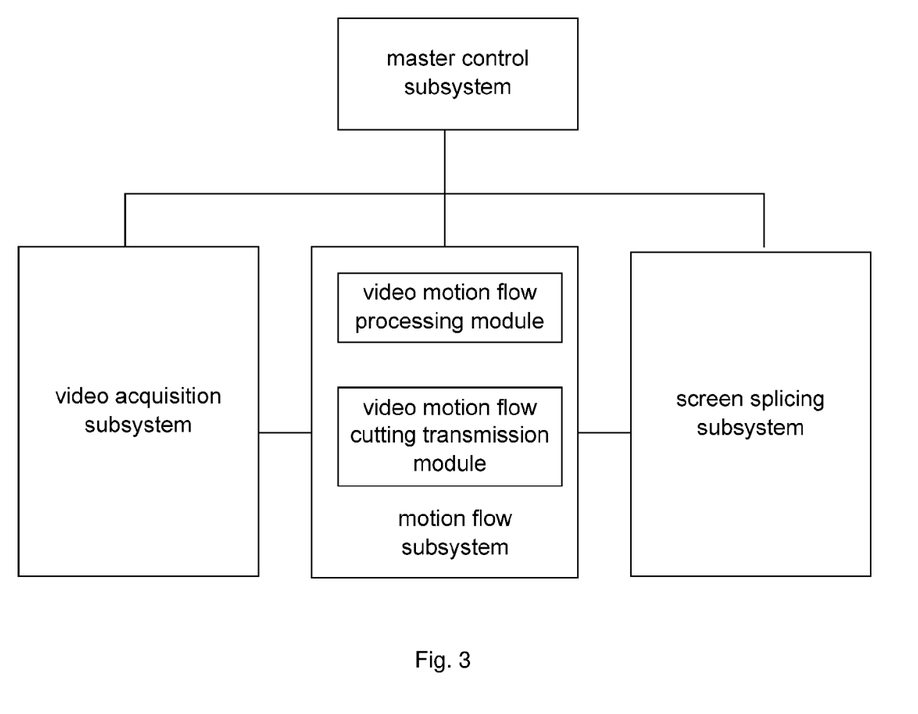
FIG. 3 is a structure diagram of a screen splicing system according to a preferred embodiment of the invention.

Preferably, as shown in FIG. 3, the smooth displaying subsystem 20 may include: a video smooth displaying processing module 200, configured to sequentially perform smooth displaying image processing on every two adjacent original video image frames in the original video data stream to generate one or more smooth displaying video image frames, and interpolate each smooth displaying video image frame into the corresponding two adjacent original video image frames which generate the smooth displaying video image frame; and a video smooth displaying cutting transmission module 202, configured to perform screen cutting processing on the video data stream into which the one or more smooth displaying video image frames are interpolated, and output the video data stream to the screen splicing subsystem.

Preferably, as shown in FIG. 3, the video smooth displaying processing module 200 is configured to sequentially acquire two adjacent original video image frames which are temporally continuous from the original video data stream, and execute smooth displaying calculation on every two adjacent original video image frames which are acquired to obtain the smooth displaying video image frames to be interpolated into every corresponding two adjacent original video image frames respectively.

In a preferred embodiment, the screen splicing system may support two video processing modes, i.e. a smooth displaying enabling video processing mode and a smooth displaying disabling video processing mode. Under the condition that the screen splicing system enables the smooth displaying image processing mode, the video acquisition subsystem may transmit original video data to the smooth displaying subsystem for smooth displaying calculation through a PCIe after acquiring the original video data, and the smooth displaying subsystem may perform screen cutting on the original video data and video data obtained by smooth displaying calculation according to a smooth displaying output sequence and externally transmit the original video data and the video data through the PCIe.

Preferably, as shown in FIG. 3, the video smooth displaying processing module 200 is configured to perform downsampling image processing on a first original video image frame and second original video image frame which are adjacent to obtain a first down-sampled video image frame and a second down-sampled video image frame respectively, perform motion estimation on the first down-sampled video image frame and the second down-sampled video image frame to estimate a global motion vector respectively, and perform motion estimation on the first original video image frame and the second original video image frame to obtain the smooth displaying video image frame to be interpolated by adopting the global motion vector.

Figure 4:
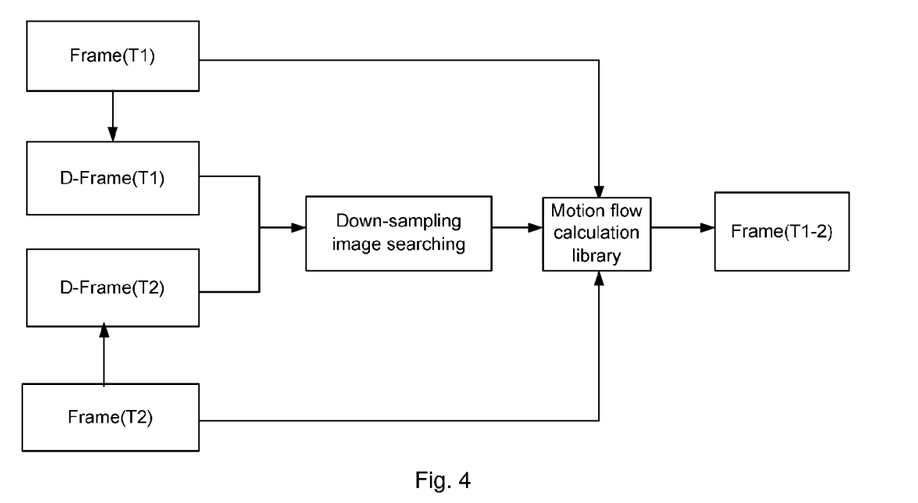
FIG. 4 is a schematic diagram of video smooth displaying calculation according to a preferred embodiment of the invention.

FIG. 4 is a schematic diagram of video smooth displaying calculation according to a preferred embodiment of the invention. As shown in FIG. 4, video smooth displaying calculation may include the following processing steps:

Step 1: acquiring two original video image frames which are temporally continuous, i.e. an original video image frame (FrameT1) at T1 and an original video image frame (FrameT2) at T2;

Step 2: performing ¼ (¼ adopted here is only a preferred implementation mode, mainly for facilitate motion estimation mentioned in Step 3, and of course, another proportion, for example: ⅛, may also be selected according to a practical condition) down-sampling image processing (scaling for ¼ simultaneously in the horizontal direction and the perpendicular direction) on FrameT1 to obtain a ¼ down-sampled video image frame (D-FrameT1) at T1, and performing ¼ down-sampling image processing on FrameT2 to obtain a ¼ down-sampled video image frame (D-FrameT2) at T2;

Step 3: performing forward motion estimation and backward motion estimation on D-FrameT1 and D-FrameT2 to further estimate a global motion vector of the down-sampled video image frames, wherein searching is performed by taking D-FrameT2 as a current video image frame and taking D-FrameT1 as a reference video image frame during forward motion estimation, and searching is performed by taking D-FrameT1 as a current video image frame and taking D-FrameT2 as a reference video image frame during backward motion estimation; and Step 4: performing forward and backward motion estimation on the original video image frames FrameT1 and FrameT2 by adopting the motion estimation and global motion vector of the down-sampled video image frames, and performing smooth displaying interpolation to obtain a smooth displaying video image frame FrameT1-2 according to a calculation result.

Preferably, as shown in FIG. 3, the video smooth displaying cutting transmission module 202 is configured to perform screen cutting processing on the video data stream into which the one or more smooth displaying video image frames are interpolated according to the number of spliced sub-screens in a screen-splicing display screen, and send the cut video data stream to the screen splicing subsystem.

Figure 5:
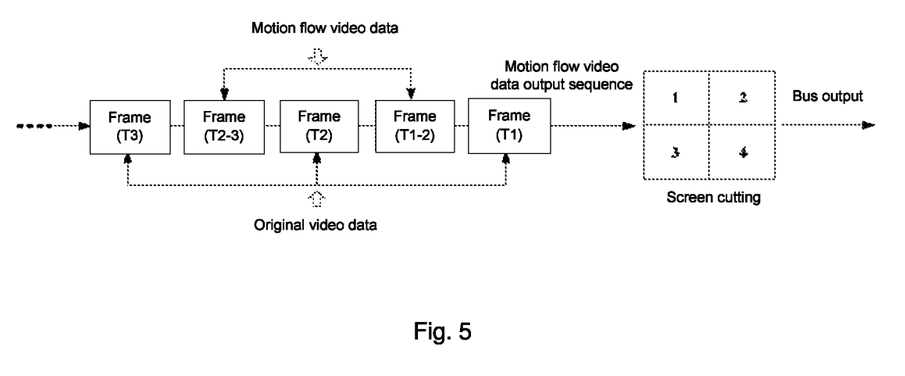
FIG. 5 is a schematic diagram of a smooth displaying video source output sequence and screen cutting transmission processing process according to a preferred embodiment of the invention.

FIG. 5 is a schematic diagram of a smooth displaying video source output sequence and screen cutting transmission processing process according to a preferred embodiment of the invention. As shown in FIG. 5, in the preferred embodiment, there are 4 spliced sub-screens in the splicing display wall, and the smooth displaying subsystem performs large screen cutting on a video source image and a smooth displaying calculation image in a display sequence, performs smooth displaying image processing on the original video image frame FrameT1 at T1 and the original video image frame FrameT2 at T2 to generate the smooth displaying video image frame FrameT1-2 and interpolates FrameT1-2 between FrameT1 and FrameT2 at first, then performs smooth displaying image processing on the original video image frame FrameT2 at T2 and an original video image frame FrameT3 at T3 to generate a smooth displaying video image frame FrameT2-3 and interpolates FrameT2-3 between FrameT2 and FrameT3, and processes the rest in the same manner to generate a smooth displaying video data output sequence. Then the smooth displaying subsystem performs screen cutting on the smooth displaying video data output sequence according to the number of the spliced sub-screens in the splicing display wall, and externally transmits each cut video data sub-blocks through the PCIe.

Preferably, as shown in FIG. 3, the screen splicing system may further include: a master control subsystem 40, and the master control subsystem 40 is configured to acquire a display layer parameter set from the screen splicing subsystem under the condition that it is determined that the smooth displaying image processing mode has been enabled, send the display layer parameter set to the smooth displaying subsystem, acquire a smooth displaying image processing parameter set from the smooth displaying subsystem, and send the smooth displaying image processing parameter set to the video acquisition subsystem.

In the preferred embodiment, the video acquisition subsystem, the smooth displaying subsystem and the screen splicing subsystem may not directly perform information interaction with one another, so that it is necessary to control each subsystem to transmit video data through the PCIe through a network command, a PCIe host command and the like to realize enabling and disabling of functions of each subsystem and cooperation among the subsystem by adopting the master control subsystem. At first, the master control subsystem may acquire a display layer related parameter, for example: a display coordinate, a layer division parameter and a receiving address of PCIe transmission, of the screen splicing subsystem according to an operating result of the user. Then, the master control subsystem statistically arranges the display layer related parameter, sends the display layer related parameter to the smooth displaying subsystem, and simultaneously enables a smooth displaying mode. In addition, the master control subsystem also receives a smooth displaying video source receiving parameter (which may include: a smooth displaying channel, a smooth displaying resource and the receiving address of PCIe transmission) from the smooth displaying subsystem, and enables smooth displaying PCIe reception. Moreover, the master control subsystem further sends a smooth displaying source switching parameter to the video acquisition subsystem, and enables smooth displaying video transmission of the video acquisition subsystem.

Preferably, as shown in FIG. 3, the video acquisition subsystem 10 is configured to judge whether the smooth displaying image processing mode has been enabled or not at present, output the original video data stream to the smooth displaying subsystem under the condition that it is determined that the smooth displaying image processing mode has been enabled, and under the condition that it is determined that the smooth displaying image processing mode has not been enabled, perform screen cutting on the original video data stream and output the original video data stream to the screen splicing subsystem.

Preferably, as shown in FIG. 3, the video acquisition subsystem 10 is further configured to acquire the original video data stream through a VP, and/or, acquire a video compression code stream through a network and decode the video compression code stream to acquire the original video data stream.

In the preferred embodiment, the video acquisition subsystem may acquire the original video data for video pre-processing, coding and PCIe on-wall display through the VP, wherein the original video data may be transmitted to the smooth displaying subsystem through the PCIe if a smooth displaying function is enabled, and if the smooth displaying function is disabled, the original video data may be transmitted to the screen splicing subsystem through the PCIe only after screen cutting. The video acquisition subsystem may also acquire the video compression code stream through the network, perform decoding processing to acquire the original video data and perform PCIe transmission according to whether the smooth displaying function is enabled or not, wherein the original video data may be transmitted to the smooth displaying subsystem through the PCIe if the smooth displaying function is enabled, and if the smooth displaying function is disabled, the original video data may be transmitted to the screen splicing subsystem through the PCIe only after screen cutting.

The abovementioned preferred implementation process will be further described below with reference to the preferred implementation mode shown in FIG. 6.

Figure 6:
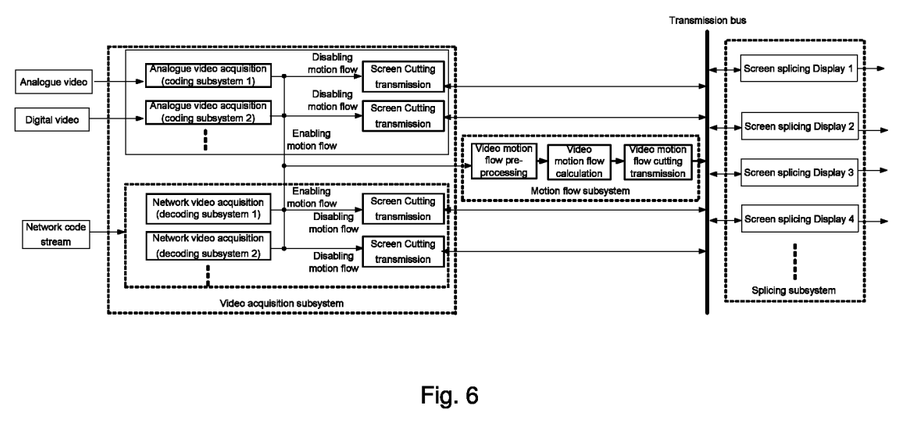
FIG. 6 is a structure diagram of a screen splicing system according to a preferred embodiment of the invention.

FIG. 6 is a structure diagram of a screen splicing system according to a preferred embodiment of the invention. As shown in FIG. 6, the screen splicing system provided by the preferred embodiment of the invention may include: a video acquisition subsystem, a smooth displaying subsystem and a screen splicing subsystem. Each subsystem may transmit video data through a PCIe, and enabling and disabling of functions of each subsystem and cooperation among the subsystems may be controlled by a master control subsystem (not shown in FIG. 6) through a network command, a PCIe host command and the like.

Functions of each subsystem in the screen splicing system provided by the preferred embodiment will be introduced below respectively.

(1) The video acquisition subsystem is mainly configured to realize functions of video acquisition, screen cutting, video transmission and the like, wherein its typical video source may include: an analogue video signal, a digital video signal of an optical fibre/SDI/DVI/HDMI and a network compression code stream.

The video acquisition subsystem may further include: a coding subsystem and a decoding subsystem.

1) The coding subsystem may acquire original video data for video pre-processing, coding and PCIe on-wall display through a VP, wherein the original video data may be transmitted to the smooth displaying subsystem through the PCIe if a smooth displaying function is enabled, and if the smooth displaying function is disabled, the original video data may be transmitted to the screen splicing subsystem through the PCIe only after screen cutting; and 2) the decoding subsystem may acquire a video compression code stream through a network, perform decoding processing to acquire the original video data and perform PCIe transmission according to whether the smooth displaying function is enabled or not, wherein the original video data may be transmitted to the smooth displaying subsystem through the PCIe if the smooth displaying function is enabled, and if the smooth displaying function is disabled, the original video data may be transmitted to the screen splicing subsystem through the PCIe only after screen cutting.

(2) The smooth displaying subsystem is mainly configured to be used when the screen splicing system enables the smooth displaying function, wherein the smooth displaying subsystem may include: a video smooth displaying pre-processing module, a video smooth displaying calculation module and a video smooth displaying cutting transmission module, wherein 1) the video smooth displaying pre-processing module is configured to receive the original video data in a local transmission or PCIe transmission manner, and perform video smooth displaying pre-processing such as scaling according to a smooth displaying requirement;

2) the video smooth displaying calculation module is configured to acquire the pre-processed video data, call a smooth displaying calculation library for video smooth displaying calculation, and output a smooth displaying image;

It is important to note that all the functions which may be realized by the video smooth displaying pre-processing module and the video smooth displaying calculation module are equivalent to those of the video smooth displaying processing module; and 3) the video smooth displaying cutting transmission module is configured to acquire the original video data and video data obtained by smooth displaying processing, perform screen cutting on the acquired video data according to a video smooth displaying output sequence and a screen cutting related control parameter, and transmit divided video blocks to each spliced display sub-screen through the PCIe.

(3) The screen splicing subsystem is mainly configured to receive the divided video blocks (including: divided smooth displaying video blocks and divided original video blocks) through the PCIe, perform processing such as scaling, de-interlacing, transparent calculation and layer overlaying on the received divided video blocks according to a screen splicing or screen wandering related display control parameter, and output the processed divided video blocks to a splicing display wall for display through a video output interface.

In the preferred embodiment, the screen splicing system may support two video processing modes, i.e. a smooth displaying enabling video processing mode and a smooth displaying disabling video processing mode. Under the condition that the screen splicing system enables the smooth displaying image processing mode, the video acquisition subsystem may transmit the original video data to the smooth displaying subsystem for smooth displaying calculation through the PCIe after acquiring the original video data, and the smooth displaying subsystem may perform screen cutting on the original video data and the video data obtained by smooth displaying calculation according to a smooth displaying output sequence and externally transmit the original video data and the video data through the PCIe. The screen splicing subsystem may receive each divided video block through the PCIe and perform processing such as layer overlaying for output and display.

(4) The master control subsystem is mainly configured to acquire a display layer related parameter, for example: a display coordinate, a layer division parameter and a receiving address of PCIe transmission, of the screen splicing subsystem according to an operating result of a user. The master control subsystem statistically arranges the display layer related parameter, sends the display layer related parameter to the smooth displaying subsystem, and simultaneously enables a smooth displaying mode. The master control subsystem also receives a smooth displaying video source receiving parameter (which may include: a smooth displaying channel, a smooth displaying resource and the receiving address of PCIe transmission) from the smooth displaying subsystem, and enables smooth displaying PCIe reception. The master control subsystem further sends a smooth displaying source switching parameter to the video acquisition subsystem, and enables smooth displaying video transmission of the video acquisition subsystem. At this moment, the screen splicing system works in a smooth displaying splicing mode.

Figure 7:
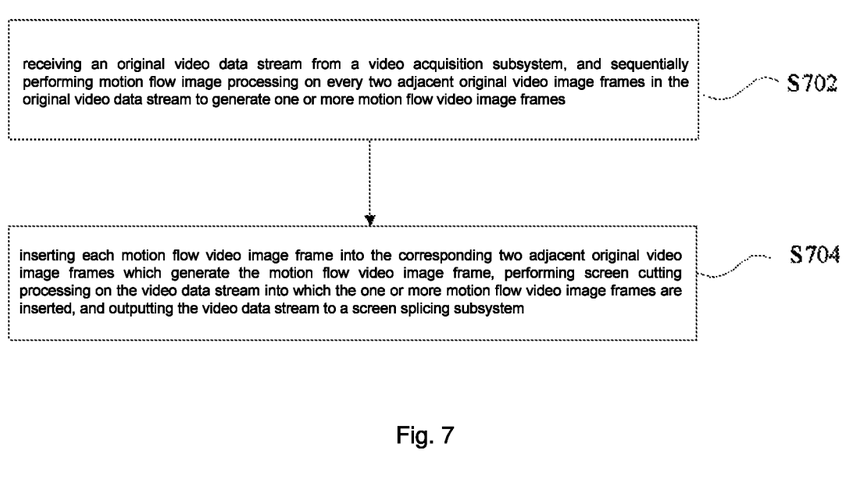
FIG. 7 is a flowchart of a video data stream processing method according to an embodiment of the invention.

FIG. 7 is a flowchart of a video data stream processing method according to an embodiment of the invention. The method is applied to the abovementioned screen splicing system, and as shown in FIG. 7, the method may include the following processing steps:

Step 702: receiving an original video data stream from the video acquisition subsystem, and sequentially performing smooth displaying image processing on every two adjacent original video image frames in the original video data stream to generate one or more smooth displaying video image frames; and Step 704: interpolating each smooth displaying video image frame into the corresponding two adjacent original video image frames which generate the smooth displaying video image frame, performing screen cutting processing on the video data stream into which the one or more smooth displaying video image frames are interpolated, and outputting the video data stream to the screen splicing subsystem.

By the method shown in FIG. 7, the problems that splicing display smoothness of a screen splicing system adopted in the related technology is poorer, that phenomena of image dithering and blurring may even occur and that viewing experiences of a user may not be so good are solved, screen splicing display smoothness is further improved, and an overall display effect of the screen splicing system is remarkably improved.

Preferably, sequentially performing smooth displaying image processing on every two adjacent original video image frames in the original video data stream to generate the one or more smooth displaying video image frames in Step 702 may include the following operation:

Step 1: performing down-sampling image processing on a first original video image frame and second original video image frame which are adjacent to obtain a first down-sampled video image frame and a second down-sampled video image frame respectively;

Step 2: performing motion estimation on the first down-sampled video image frame and the second down-sampled video image frame to estimate a global motion vector respectively; and Step 3: performing motion estimation on the first original video image frame and the second original video image frame to obtain the smooth displaying video image frame to be interpolated by adopting the global motion vector.

From the above, it can be seen that the embodiment achieves the following technical effects (it is important to note that these effects may be achieved by some preferred embodiments): the embodiment of the invention provides a technical solution to smooth displaying splicing and/or smooth displaying wandering of a screen-splicing displayed video, and according to the technical solution, a step of performing smooth displaying calculation on the video source may be added between the video acquisition subsystem and the screen splicing subsystem, thereby implementing a screen smooth displaying system integrating video acquisition, screen splicing, screen wandering, smooth displaying splicing and motion low wandering. The screen smooth displaying system may include: the video acquisition subsystem, a video smooth displaying calculation subsystem, a screen cutting transmission subsystem and a screen splicing display subsystem, and the screen smooth displaying system implements smooth displaying splicing and smooth displaying wandering and obviously improves screen splicing display smoothness, thereby remarkably improving the overall display effect of the screen splicing system.

Obviously, those skilled in the art should know that each module or step of the invention may be implemented by a universal computing device, and the modules or steps may be concentrated on a single computing device or distributed on a network formed by multiple computing devices, and may optionally be implemented by program codes executable for the computing devices, so that the modules or steps may be stored in a storage device for execution with the computing devices, or may form each integrated circuit module under a certain condition, or multiple modules or steps therein may form a single integrated circuit module for implementation. As a consequence, the invention is not limited to any specific hardware and software combination.

The above is only the preferred embodiment of the invention and not intended to limit the invention, and for those skilled in the art, the invention may have various modifications and variations. Any modifications, equivalent replacements, improvements and the like within the spirit and principle of the invention shall fall within the scope of protection of the invention.

INDUSTRIAL APPLICABILITY

As mentioned above, the screen splicing system and video data stream processing method provided by the embodiment of the invention have the following beneficial effects: on the basis of the screen splicing system adopted in the related technology, the original video data stream acquired by the video acquisition subsystem is not directly output to the screen splicing subsystem, and instead, the original video data stream is output to the screen splicing subsystem after smooth displaying image processing, so that the screen splicing display smoothness is further improved, and the overall display effect of the screen splicing system is remarkably improved.

What is claimed is:
1. A screen splicing system, comprising:
a video acquisition subsystem, configured to acquire an original video data stream, and output the acquired original video data stream to a smooth displaying subsystem after a smooth displaying image processing mode is enabled;
the smooth displaying subsystem, connected with the video acquisition subsystem and configured to receive the original video data stream from the video acquisition subsystem, sequentially perform smooth displaying image processing and screen cutting processing on the original video data stream and send the cut video data stream to a screen splicing subsystem; and
the screen splicing subsystem, connected with the smooth displaying subsystem and configured to perform splicing processing on the cut video data stream and send the spliced video data stream to a splicing display wall;
wherein the smooth displaying subsystem comprises:
a video smooth displaying processing module, configured to sequentially perform smooth displaying image processing on every two adjacent original video image frames in the original video data stream to generate one or more smooth displaying video image frames, and interpolate each smooth displaying video image frame into the corresponding two adjacent original video image frames which generate the smooth displaying video image frame, and a video smooth displaying cutting transmission module, configured to perform screen cutting processing on the video data stream into which the one or more smooth displaying video image frames are interpolated, and output the video data stream to the screen splicing subsystem.

2. The system according to claim 1, wherein the video smooth displaying processing module is configured to sequentially acquire two adjacent original video image frames which are temporally continuous from the original video data stream, and execute smooth displaying calculation on every two adjacent original video image frames which are acquired to obtain the smooth displaying video image frames to be interpolated into every corresponding two adjacent original video image frames respectively.

3. A video data stream processing method, applied to the screen splicing system according to claim 2, the method comprising:
receiving an original video data stream from the video acquisition subsystem, and sequentially performing smooth displaying image processing on every two adjacent original video image frames in the original video data stream to generate one or more smooth displaying video image frames; and
interpolating each smooth displaying video image frame into the corresponding two adjacent original video image frames which generate the smooth displaying video image frame, performing screen cutting processing on the video data stream into which the one or more smooth displaying video image frames are interpolated, and outputting the video data stream to the screen splicing subsystem.

4. The system according to claim 2, wherein the video smooth displaying processing module is configured to perform down-sampling image processing on a first original video image frame and second original video image frame which are adjacent to obtain a first down-sampled video image frame and a second down-sampled video image frame respectively, perform motion estimation on the first down-sampled video image frame and the second down-sampled video image frame to estimate a global motion vector respectively, and perform motion estimation on the first original video image frame and the second original video image frame to obtain the smooth displaying video image frame to be interpolated by adopting the global motion vector.

5. A video data stream processing method, applied to the screen splicing system according to claim 4, the method comprising:
receiving an original video data stream from the video acquisition subsystem, and sequentially performing smooth displaying image processing on every two adjacent original video image frames in the original video data stream to generate one or more smooth displaying video image frames; and
interpolating each smooth displaying video image frame into the corresponding two adjacent original video image frames which generate the smooth displaying video image frame, performing screen cutting processing on the video data stream into which the one or more smooth displaying video image frames are interpolated, and outputting the video data stream to the screen splicing subsystem.

6. The system according to claim 4, wherein the video smooth displaying cutting transmission module is configured to perform screen cutting processing on the video data stream into which the one or more smooth displaying video image frames are interpolated according to the number of spliced sub-screens in a screen-splicing display screen, and send the cut video data stream to the screen splicing subsystem.

7. A video data stream processing method, applied to the screen splicing system according to claim 6, the method comprising:
receiving an original video data stream from the video acquisition subsystem, and sequentially performing smooth displaying image processing on every two adjacent original video image frames in the original video data stream to generate one or more smooth displaying video image frames; and
interpolating each smooth displaying video image frame into the corresponding two adjacent original video image frames which generate the smooth displaying video image frame, performing screen cutting processing on the video data stream into which the one or more smooth displaying video image frames are interpolated, and outputting the video data stream to the screen splicing subsystem.

8. The system according to claim 1, further comprising: a master control subsystem, wherein
the master control subsystem is configured to acquire a display layer parameter set from the screen splicing subsystem under the condition that it is determined that the smooth displaying image processing mode has been enabled, send the display layer parameter set to the smooth displaying subsystem, acquire a smooth displaying image processing parameter set from the smooth displaying subsystem, and send the smooth displaying image processing parameter set to the video acquisition subsystem.

9. A video data stream processing method, applied to the screen splicing system according to claim 8, the method comprising:
receiving an original video data stream from the video acquisition subsystem, and sequentially performing smooth displaying image processing on every two adjacent original video image frames in the original video data stream to generate one or more smooth displaying video image frames; and
interpolating each smooth displaying video image frame into the corresponding two adjacent original video image frames which generate the smooth displaying video image frame, performing screen cutting processing on the video data stream into which the one or more smooth displaying video image frames are interpolated, and outputting the video data stream to the screen splicing subsystem.

10. The system according to claim 1, wherein the video acquisition subsystem is configured to judge whether the smooth displaying image processing mode has been enabled or not at present, output the original video data stream to the smooth displaying subsystem under the condition that it is determined that the smooth displaying image processing mode has been enabled, and under the condition that it is determined that the smooth displaying image processing mode has not been enabled, perform screen cutting on the original video data stream and output the original video data stream to the screen splicing subsystem.

11. A video data stream processing method, applied to the screen splicing system according to claim 10, the method comprising:
receiving an original video data stream from the video acquisition subsystem, and sequentially performing smooth displaying image processing on every two adjacent original video image frames in the original video data stream to generate one or more smooth displaying video image frames; and interpolating each smooth displaying video image frame into the corresponding two adjacent original video image frames which generate the smooth displaying video image frame, performing screen cutting processing on the video data stream into which the one or more smooth displaying video image frames are interpolated, and outputting the video data stream to the screen splicing subsystem.

12. The system according to claim 1, wherein the video acquisition subsystem is further configured to acquire the original video data stream through a Video Port (VP), and/or, acquire a video compression code stream through a network and decode the video compression code stream to acquire the original video data stream.

13. A video data stream processing method, applied to the screen splicing system according to claim 12, the method comprising:

receiving an original video data stream from the video acquisition subsystem, and sequentially performing smooth displaying image processing on every two adjacent original video image frames in the original video data stream to generate one or more smooth displaying video image frames; and interpolating each smooth displaying video image frame into the corresponding two adjacent original video image frames which generate the smooth displaying video image frame, performing screen cutting processing on the video data stream into which the one or more smooth displaying video image frames are interpolated, and outputting the video data stream to the screen splicing subsystem.

14. A video data stream processing method, applied to the screen splicing system according to claim 1, the method comprising:

receiving an original video data stream from the video acquisition subsystem, and sequentially performing smooth displaying image processing on every two adjacent original video image frames in the original video data stream to generate one or more smooth displaying video image frames; and interpolating each smooth displaying video image frame into the corresponding two adjacent original video image frames which generate the smooth displaying video image frame, performing screen cutting processing on the video data stream into which the one or more smooth displaying video image frames are interpolated, and outputting the video data stream to the screen splicing subsystem.

15. The method according to claim 14, wherein sequentially performing smooth displaying image processing on every two adjacent original video image frames in the original video data stream to generate the one or more smooth displaying video image frames comprises:

performing down-sampling image processing on a first original video image frame and second original video image frame which are adjacent to obtain a first down-sampled video image frame and a second down-sampled video image frame respectively;

performing motion estimation on the first down-sampled video image frame and the second down-sampled video image frame to estimate a global motion vector respectively; and performing motion estimation on the first original video image frame and the second original video image frame to obtain the smooth displaying video image frame to be interpolated by adopting the global motion vector.

16. A video data stream processing method, applied to the screen splicing system according to claim 1, the method comprising:

receiving an original video data stream from the video acquisition subsystem, and sequentially performing smooth displaying image processing on every two adjacent original video image frames in the original video data stream to generate one or more smooth displaying video image frames; and interpolating each smooth displaying video image frame into the corresponding two adjacent original video image frames which generate the smooth displaying video image frame, performing screen cutting processing on the video data stream into which the one or more smooth displaying video image frames are interpolated, and outputting the video data stream to the screen splicing subsystem.

* * * * *